United States Patent [19]
Tamai et al.

[11] Patent Number: 5,580,399
[45] Date of Patent: Dec. 3, 1996

[54] MAGNETIC RECORDING MEDIUM

[75] Inventors: Kiminori Tamai; Yoichi Yoshimura, both of Nagano, Japan

[73] Assignee: TDK Corporation, Tokyo, Japan

[21] Appl. No.: 593,014

[22] Filed: Jan. 29, 1996

Related U.S. Application Data

[63] Continuation of Ser. No. 198,638, Feb. 18, 1994, abandoned.

[30] Foreign Application Priority Data

Jan. 19, 1994 [JP] Japan ................................. 6-018866

[51] Int. Cl.⁶ ............................................. H01F 1/055
[52] U.S. Cl. ......................... 148/301; 148/309; 148/311; 420/83
[58] Field of Search .................... 148/301, 307, 148/309, 311; 420/78, 80, 83

[56] References Cited

U.S. PATENT DOCUMENTS

| | | | |
|---|---|---|---|
| 4,671,828 | 6/1987 | Yamauchi et al. | 420/78 |
| 4,683,012 | 7/1987 | Yamauchi et al. | 148/301 |
| 5,135,584 | 8/1992 | Fujiwara | 148/301 |
| 5,156,922 | 10/1992 | Mishima et al. | 148/307 |
| 5,466,306 | 11/1995 | Mishima et al. | 148/311 |

FOREIGN PATENT DOCUMENTS 4-177806  6/1992  Japan ................................. 148/301

*Primary Examiner*—George Wyszomierski
*Attorney, Agent, or Firm*—Oblon, Spivak, McClelland, Maier & Neustadt, P.C.

[57] ABSTRACT

In a magnetic recording medium of the coating type using a metal magnetic powder, for the purpose of improving switching field distribution (SFD) and electromagnetic properties, there is used a metal magnetic powder based on iron and containing Al and/or Si and a rare earth element, the content of Al and/or Si being 0.5 to 8% by weight based on the iron and the content of rare earth element (inclusive of Y) being 1 to 10% by weight based on the iron, and optionally 6 to 30% by weight of Co, preferably having a length of 0.06 to 0.30 μm and an aspect ratio of from 4 to 15.

6 Claims, No Drawings

MAGNETIC RECORDING MEDIUM

This application is a continuation of application Ser. No. 08/198,638, filed on Feb. 18, 1994, now abandoned.

BACKGROUND OF THE INVENTION

1. Field of the Invention

This invention relates to a magnetic recording medium, and more particularly, to an improvement in iron-base metal magnetic powder used in a magnetic recording medium of the coating type.

2. Prior Art

There is a desire for increasing magnetic recording density, and magnetic recording media meeting such requirements should have high coercivity and increased saturation magnetization. Then 8-mm video tape, DAT and similar magnetic recording media use in the magnetic layer iron-base metal magnetic powder having high coercivity and increased saturation magnetization and such media have been used in practice.

A variety of proposals have been made in order to establish higher coercivity and greater saturation magnetization. Exemplary are metal magnetic powders having silicon and other various compounds adsorbed to the surface (Japanese Patent Application Kokai (JP-A) Nos. 159904/1984, 162205/1984, 156209/1987, etc.).

These powders are prepared by adding an aqueous solution of a compound to a slurry of raw material particles such as $\gamma$-$Fe_2O_3$ or $\alpha$-FeOOH and causing the raw material particles to adsorb the compound, followed by reducing reaction to form metal magnetic particles. When it is desired to adsorb more than one compound in a composite form, aqueous solutions of respective compounds are separately prepared and the compounds are separately applied to the raw material particles.

Also JP-A 140221/1978 discloses a method for preparing acicular crystal alloy magnetic particles by heat reducing acicular crystal hydrous or anhydrous ferric oxide particles containing Co or Co and Ni and coated with silicate on the surface and further forming a magnetite coating on the particle surface.

Further JP-A 161007/1980 discloses a method for preparing acicular crystal metallic iron magnetic particle powder by adding a water-soluble silicate to an aqueous solution containing $Fe(OH)_2$ at pH 11 or higher, effecting oxidation to form acicular crystal goethite particles, then converting them into acicular crystal hematite particles, and further heating and firing the particles in an atmosphere consisting of heated steam and non-reducing gas to form high density hematite particles, followed by heat reduction.

Further JP-A 306526/1988 discloses a metal magnetic powder based on a metal magnetic powder and/or iron nitride magnetic powder and containing at least one member selected from Al organic compounds, Ti organic compounds, Zr organic compounds, and Si organic compounds.

And JP-A 57701/1989 discloses metal magnetic powder which is prepared by separately applying Zr and Al compounds and a Ni and/or Cu compound to hydrous or anhydrous iron oxide, followed by reduction.

Further JP-A 257309/1989 proposes metal magnetic powder which is prepared by applying a Co compound or Co ion to hydrous or anhydrous iron oxide, followed by reduction.

Nevertheless, for example, the 8-mm video tape requires higher outputs and improvements in S/N and C/N, and further improvements in these properties are necessary when digital media are taken into account.

To this end, media should be increased in residual magnetization Br, increased in squareness ratio Br/Bm, reduced in switching field distribution (SFD), or improved in surface property of tape to reduce a spacing loss, and there is a need for improvements in these respects.

DISCLOSURE OF THE INVENTION

An object of the present invention is to provide a magnetic recording medium having minimal switching field distribution (SFD) and improved electromagnetic properties.

This and other objects are achieved by the present invention which is defined below as (1) to (10).

(1) A magnetic recording medium comprising a magnetic layer containing an iron-base metal magnetic powder on a non-magnetic substrate,
wherein said iron-base metal magnetic powder contains at least, 0.5 to 8% by weight based on the iron of Al and/or Si and 1 to 10% by weight based on the iron of a rare earth element inclusive of Y.

(2) The magnetic recording medium of (1) wherein said iron-base metal magnetic powder particles have a length of 0.06 to 0.30 µm and an aspect ratio of from 4 to 15.

(3) The magnetic recording medium of (1) wherein said iron-base metal magnetic powder further contains up to 30% by weight based on the iron of Co.

(4) The magnetic recording medium of (3) wherein the content of Co is 6 to 30% by weight based on the iron.

(5) The magnetic recording medium of (3) wherein said iron-base metal magnetic powder particles have a length of 0.06 to 0.30 µm and an aspect ratio of from 4 to 15.

(6) The magnetic recording medium of (1) wherein said iron-base metal magnetic powder further contains up to 1% by weight based on the iron of at least one member selected from the group consisting of Ca, Ba, Sr, Mg, Ni, Cr, and Zn.

(7) The magnetic recording medium of (6) wherein said iron-base metal magnetic powder particles have a length of 0.06 to 0.30 µm and an aspect ratio of from 4 to 15.

(8) The magnetic recording medium of (6) wherein said iron-base metal magnetic powder further contains up to 30% by weight based on the iron of Co.

(9) The magnetic recording medium of (8) wherein said iron-base metal magnetic powder particles have a length of 0.06 to 0.30 µm and an aspect ratio of from 4 to 15.

(10) The magnetic recording medium of any one of (1) to (9) wherein said iron-base metal magnetic powder is obtained by forming hydrous iron oxide, introducing Al and/or Si and the rare earth element therein, and reducing in a reducing atmosphere.

ILLUSTRATIVE CONSTRUCTION

Below the illustrative construction of the present invention is described in detail.

The present invention includes a magnetic layer which uses a metal magnetic powder based on iron. The metal magnetic powder further contains aluminum Al and/or silicon Si and a rare earth element inclusive of yttrium Y.

The content of Al and/or Si is 0.5 to 8% by weight based on Fe. The content of the rare earth element inclusive of Y is 1 to 10% by weight, preferably 1 to 5% by weight based on Fe. The above-mentioned contents of these additive elements are values calculated as elements.

Better properties are imparted to the metal magnetic powder by limiting the content of Al and/or Si to the above-mentioned range. Particles as reduced are collapsed in shape if the content of Al and/or Si is less than 0.5% by weight, whereas magnetic properties deteriorate with a content in excess of 8% by weight.

Better properties are obtained by limiting the content of rare earth element to the above-mentioned range. Rare earth element contents of less than 1% by weight are too low for the additive element to be effective whereas contents of more than 10% by weight rather lower magnetic properties and deteriorate electromagnetic properties including output.

It is preferred in the practice of the invention that the metal magnetic powder further contains cobalt. The Co content is preferably up to 30% by weight, especially 6 to 30% by weight based on Fe. Inclusion of Co enhances the advantages of the invention and especially improves electromagnetic properties including output. The Co addition would be ineffective with too low contents whereas too high Co contents would cause cobalt precipitation, rather deteriorating magnetic properties and exacerbating electromagnetic properties including output.

It is also preferred that at least one member selected from Ca, Ba, Sr, Mg, Ni, Cr, and Zn is further contained in an amount of up to 1% by weight, especially 0.1 to 1.0% by weight based on Fe.

In the practice of the invention, the metal magnetic powder is preferably obtained by forming hydrous iron oxide, introducing Al and/or Si and a rare earth element therein, and reducing in a reducing atmosphere. The advantages of the invention are enhanced by employing such a preparation process. Co, when added, is preferably introduced prior to the introduction of Al and/or Si and a rare earth element because the advantages of the invention are enhanced thereby.

The hydrous iron oxide used herein includes iron oxyhydroxides, for example, α-FeOOH (goethite), β-FeOOH (akaganite), and γ-FeOOH (lepidocrocite).

The hydrous iron oxide is preferably obtained by reacting a ferrous salt aqueous solution and an alkali aqueous solution to form an aqueous solution of ferrous hydroxide, followed by oxidation such as air oxidation. Preferably in this process, a Ni salt, a salt of Group 2A element in the Periodic Table such as salts of Ca, Ba, St, and Mg, a Cr salt, or a Zn salt is co-present in the ferrous salt aqueous solution. By properly selecting such a salt, the shape (aspect ratio) and other factors of particles can be controlled. Preferred ferrous salts are ferrous chloride and ferrous sulfate.

Also the alkali is preferably NaOH, $NH_4OH$, $(NH_4)_2CO_3$, $Na_2CO_3$, etc. Further the preferred Ni salt is nickel chloride, etc. and the preferred salts of Ca, Ba and Sr are chlorides such as calcium chloride, barium chloride, strontium chloride, chromium chloride, and zinc chloride.

Using the above-mentioned hydrous iron oxide as the starting material, a slurry thereof is prepared and treated as follows. The slurry contains about 5 to about 20% by weight of hydrous iron oxide.

In the practice of the invention, cobalt, when added, is introduced prior to the introduction of Al and/or Si and a rare earth element as mentioned above. More particularly, a cobalt compound such as cobalt sulfate and cobalt chloride is used and an aqueous solution of the cobalt compound is mixed and agitated with the slurry of hydrous iron oxide. The cobalt compound aqueous solution may have a concentration of about 0.5 to about 1.5M.

Next, Al and/or Si is introduced as follows. After a slurry of hydrous iron oxide preferably containing Co is prepared, an aqueous solution containing an Al compound and/or a Si compound and an aqueous solution containing a rare earth element compound are separately added to the slurry and agitated and mixed.

The aqueous solution containing an Al compound and/or a Si compound may have a concentration of 0.5 to 1.5M and may contain either one of the compounds. When the solution contains both of the compounds, the total amount of the compounds falls in the above-mentioned range.

The aluminum compound used includes sodium aluminate, sodium metaaluminate, etc. and the silicon compound used includes sodium silicate, etc.

The preferred rare earth elements which are introduced in the practice of the invention include Nd, Sm, Gd, Dy, La, Y, etc.

The rare earth element compounds used in preparing the above-mentioned aqueous solution include chlorides such as neodymium chloride, samarium chloride, gadolinium chloride, dysprosium chloride, lanthanum chloride, and yttrium chloride and nitrates such as neodymium nitrate and gadolinium nitrate. The aqueous solution may have a concentration of about 0.5 to about 1.5M. Two or more rare earth elements may be used in admixture.

It is preferred in the practice of the invention that an aqueous solution containing Al and/or Si and an aqueous solution containing a rare earth element be separately prepared and added to the slurry. In some cases, it is acceptable that an aqueous solution containing Al and/or Si and a rare earth element is prepared and added to the slurry.

In the embodiment wherein the aqueous solutions are separately prepared and added, both the solutions may be added at the same time or one solution may be added before the other solution is added. When the latter procedure is employed, it is preferred that the aqueous solution containing Al and/or Si is added first and the aqueous solution containing a rare earth element is then added.

According to the invention, hydrous iron oxide containing Al and/or Si and a rare earth element and preferably Co is obtained in this way. The next step is to reduce the resulting hydrous iron oxide containing Al and/or Si and a rare earth element.

Reduction is preferably performed by heating in a reducing atmosphere. In general, the reducing atmosphere is preferably a hydrogen gas atmosphere wherein the flow rate of hydrogen gas may be suitably selected. The heating temperature may range from about 400° C. to about 550° C. and is preferably maintained for about 5 to about 8 hours. The present invention inhibits sintering during the heat reduction step because Al and/or Si has been introduced as mentioned above.

The thus obtained metal magnetic powder contains iron as a major component, aluminum and/or silicon and a rare earth element in the above-specified amounts, and preferably cobalt. It is believed that these additive elements except for cobalt are predominantly present near the surface of magnetic powder particles. It is also believed that cobalt is present in the interior of particles or both in the interior and at the surface of particles.

Further it is believed that these additive elements are present in the compound form as added, or in oxide or hydroxide form, or even in alloy form. The additive elements may be present as a mixture of such forms. This can be confirmed by ESCA or the like. The content of each element is as previously specified and can be confirmed by ICP spectroscopy.

By employing a preparation process as mentioned above, there is obtained a metal magnetic powder of satisfactory particle size distribution which is advantageous for achieving the advantages of the invention.

The metal magnetic powder obtained in the present invention is acicular, granular or spindle-shaped, with the acicular or spindle shape being preferred for 8-mm video tape use. Particles have a length or major axis of 0.06 to 0.30 μm on average, a breadth or minor axis of 0.015 to 0.04 μm on average and an aspect ratio of from 4 to 15 on average. These parameters may be confirmed by TEM photography or the like.

Further, the metal magnetic powder has a coercivity (Hc) of about 1,500 to about 2,200 Oe, especially about 1,500 to about 1,800 Oe, a saturation magnetic flux density ($\sigma_s$) of about 110 to about 150 emu/g, especially about 110 to about 140 emu/g, and a specific surface area of about 50 to about 65 m$^2$/g as measured by a BET method.

Also the metal magnetic powder particles may have an oxide coating on the surface. A magnetic recording medium using such a metal magnetic powder having an oxide coating is advantageously immune to a lowering of magnetic flux density by an ambient environment such as temperature and humidity and deterioration of properties by occurrence of rust in the magnetic layer.

In the present invention, the magnetic layer is generally formed using only the metal magnetic powder although another magnetic powder such as metal magnetic powder or oxide magnetic powder may be used in combination in amounts of less than 50% by weight, if necessary.

A magnetic coating composition is prepared from the metal magnetic powder using a binder which may be selected from thermoplastic binders, thermosetting binders, and electron beam curable binders. The metal magnetic powder and the binder are mixed at a mix ratio $W_M/W_B$ of from about 3/1 to about 10/1 wherein $W_M$ is the weight of metal magnetic powder and $W_B$ is the weight of binder.

For any of the binders used, various additives such as antistatic agents, lubricants, dispersants, abrasives and coating strength reinforcing agents are advantageously used in accordance with a particular application. It is noted that the magnetic layer has a thickness of about 0.5 to about 6 μm. Especially for the 8-mm video tape, the thickness is preferably about 2.0 to about 3.5 mm.

The non-magnetic substrate or support on which the magnetic layer is coated may be made of any of conventional well-known materials. The medium of the invention has the above-mentioned magnetic layer on either one or each of the surfaces of a substrate. If desired, an undercoat layer, backcoat layer or the like may be provided. The magnetic recording medium of the invention may take any of various forms.

The thus obtained medium has excellent magnetic properties as demonstrated by a coercivity (Hc) of about 1,450 to about 2,100 Oe, especially about 1,450 to about 1,700 Oe, a residual magnetization (Br) of about 2,000 to about 3,200 G, especially about 2,000 to about 2,700 G, a squareness ratio (Br/Bm) of about 0.75 to about 0.9, an orientation (OR) of about 1.5 to about 3.0, and a switching field distribution (SFD) of about 0.35 to about 0.55. It has excellent electromagnetic properties as demonstrated by increased outputs in the high-frequency region.

EXAMPLE

Examples of the present invention are given below by way of illustration.

Example 1

In 20 liters of H$_2$O heated at 45° C. was dissolved 1,000 grams of FeCl$_2$.4H$_2$O. To this solution was added a solution which had been prepared by dissolving CaCl$_2$ in 100 ml of H$_2$O so as to give a Ca amount of 0.5% by weight relative to Fe. The mixture was agitated and mixed for 30 minutes. Next, to the solution was slowly added an aqueous solution of 300 grams NaOH in 1000 ml H$_2$O at 45° C. After the completion of addition, the mixture was agitated and mixed for 60 minutes. After the mixture temperature was raised to 70° C., the mixture was agitated for a further 6 hours while blowing air at a flow rate of 50 liter/min. Subsequent cooling to room temperature, water washing, filtration, and drying at 60° C. for 24 hours yielded hydrous iron oxide.

The resulting hydrous iron oxide, 100 grams, was poured into 6 liters of H$_2$O, which was agitated and mixed. To the slurry were added 1 liter of an aqueous solution prepared by dissolving sodium silicate (Na$_2$SiO$_3$) so as to give a Si amount of 1.0% by weight relative to Fe and sodium aluminate (Na$_3$AlO$_3$) so as to give an Al amount of 2.0% by weight relative to Fe and 1 liter of an aqueous solution prepared by dissolving neodymium chloride (NdCl$_3$.6H$_2$O) in an amount of 2.5% by weight relative to Fe. The mixture was thoroughly agitated, followed by filtration, washing and drying.

A 50-gram portion was weighed from the resulting hydrous iron oxide and reduced with hydrogen at a flow rate of 1 liter/min. and a temperature of 450° C. over 6 hours. After cooling down to room temperature, the powder was immersed in a toluene solution for 10 minutes while blowing air and dried in air, obtaining a metal magnetic powder. This metal magnetic powder is designated No. 1.

The resulting metal magnetic powder No. 1 had an average length (L) of 0.14 μm and an aspect ratio (L/W) of 7 as measured from a TEM photograph. It had a Si content relative to Fe (Si/Fe) of 0.97% by weight, a Al content relative to Fe (Al/Fe) of 1.92% by weight, and a Nd content relative to Fe (Nd/Fe) of 2.3% by weight.

It is to be noted that the Si, Al and Nd contents of metal magnetic powder No. 1 were determined by ICP spectroscopy. It was also confirmed by ESCA and the like that Ca, Si, Al and Nd were predominantly present at the surface of particles. The Ca content was 0.47% by weight relative to Fe as measured by ICP spectroscopy.

By following the same procedure as metal magnetic powder sample No. 1 except that 1 liter of an aqueous solution prepared by dissolving cobalt chloride so as to give a Co amount of 18.0% by weight relative to Fe was added before the addition of sodium silicate, sodium aluminate and neodymium chloride, there was obtained a metal magnetic powder sample No. 2 (L=0.15 μm, L/W=6, Co/Fe=17.48% by weight).

Understandably, in metal magnetic powder sample No. 2, the Ca, Si, Al, and Nd contents were the same as in No. 1 and the Co content was similarly determined. It was also confirmed by ESCA and the like that Co was predominantly rich in the interior of particles.

Metal magnetic powder samples, Nos. 3 to 10, were prepared by the same procedure as sample No. 2 except that the amounts of Ca, Si, Al, Nd, and Co added were changed as shown in Table 1.

Using each of the thus obtained metal magnetic powders, Nos. 1 to 10, a magnetic coating composition was prepared in accordance with the following formulation.

|  | Parts by weight |
| --- | --- |
| Metal magnetic powder | 100 |
| Vinyl chloride-hydroxyl-containing methacrylate copolymer (polymerization degree ~400, containing polar group) | 11.7 |
| Polyurethane resin (molecular weight ~40,000, containing polar group) | 5 |
| Al$_2$O$_3$ | 3 |
| Anionic surface active agent | 2 |
| Stearic acid | 2 |
| Methyl ethyl ketone | 80 |
| Toluene | 80 |
| Cyclohexanone | 40 |

To the magnetic coating composition, Colonate L as a curing agent was added in an amount of 10 parts by weight relative to the resin components. The magnetic coating composition was coated on a polyethylene terephthalate (PET) film of 10 μm thick, oriented under a magnetic field of 4,000 G, and dried.

The coating was then calendered and heat cured at 60° C. for 24 hours. The magnetic layer had a final thickness of 2.7 μm. The coated film was cut to a width of 8 mm by a slitter, obtaining a tape sample. The resulting tape samples are designated tape sample Nos. 1 to 10 corresponding to the respective metal magnetic powders.

Metal magnetic powder Nos. 1 to 10 were measured for L, L/W, specific surface area by a BET method, coercivity (Hc), and saturation magnetic flux density (σs). Also tape sample Nos. 1 to 10 were measured for coercivity (Hc), residual magnetization (Br), squareness ratio (Br/Bm), orientation (OR), switching field distribution (SFD), and output at 7 MHz. Among these, the switching field distribution (SFD) was determined as follows.

Switching Field Distribution (SFD)

The SFD was calculated as ΔHc/Hc from Hc and a half-value width (ΔHc) of a differential curve (Hc distribution) obtained when a magnetic field of 10 kOe was applied by a vibrating sample magnetometer (VSM).

The results are shown in Tables 1 and 2.

TABLE 1

| Sample No. | Additive element content (wt %) | | | | |
|---|---|---|---|---|---|
| | Si | Al | Rare earth | Co | Other |
| 1 (invention) | 0.97 | 1.92 | Nd (2.3) | — | Ca (0.47) |
| 2 (invention) | 0.97 | 1.92 | Nd (2.3) | 17.48 | Ca (0.47) |
| 3 (invention) | 0.97 | 1.92 | Nd (2.3) | 6.40 | Ca (0.47) |
| 4 (comparison) | 0.97 | 1.92 | — | — | Ca (0.47) |
| 5 (invention) | 0 | 4.85 | Nd (2.3) | 6.40 | Ca (0.47) |
| 6 (invention) | 3.5 | 0 | Nd (2.3) | 6.40 | Ca (0.47) |
| 7 (comparison) | 0.97 | 1.92 | — | — | — |
| 8 (invention) | 0.97 | 1.92 | Nd (2.3) | — | — |
| 9 (comparison) | 0.97 | 1.92 | Nd (11.5) | — | — |
| 10 (comparison) | 0.97 | 1.92 | — | 6.40 | Ca (0.47) |

Example 2

A metal magnetic powder No. 21 was obtained by following the same procedure as metal magnetic powder No. 3 in Example 1 except that $BaCl_2$ was added instead of $CaCl_2$ so as to give a Ba amount of 0.3% by weight relative to Fe and neodymium chloride was added so as to give a Nd amount of 1.5% by weight relative to Fe.

The respective additive elements except for Co were present at the surface of particles as in Example 1. Their contents were Nd/Fe=1.4% by weight, Si/Fe=0.98% by weight, Al/Fe=1.92% by weight, Co/Fe=6.42% by weight, and Ba/Fe=0.27% by weight. It is to be noted that Co was present both at the surface and in the interior.

Metal magnetic powder sample Nos. 22 to 31 were obtained by the same procedure as metal magnetic powder sample No. 21 except that the amounts of Ba, Si, Al, Nd, and Co added were changed as shown in Table 3.

Using these metal magnetic powder sample Nos. 21 to 31, tape sample Nos. 21 to 31 were fabricated as in Example 1.

The metal magnetic powder samples and tape samples were measured for various properties as in Example 1. The results are shown in Tables 3 and 4.

TABLE 2

| Sample No. | Powder properties | | | | | Tape properties | | | | | |
|---|---|---|---|---|---|---|---|---|---|---|---|
| | L (μm) | L/W | BET (m²/g) | Hc (Oe) | σ_x (emu/g) | Hc (Oe) | Br (G) | Br/Bm | OR | SFD | Output (dB) |
| 1 (invention) | 0.14 | 7 | 60.0 | 1670 | 120.5 | 1560 | 2100 | 0.800 | 1.70 | 0.510 | 0 |
| 2 (invention) | 0.15 | 6 | 58.0 | 1750 | 133.5 | 1650 | 2480 | 0.785 | 1.58 | 0.520 | +1.0 |
| 3 (invention) | 0.14 | 7 | 59.5 | 1710 | 126.5 | 1620 | 2280 | 0.805 | 1.72 | 0.507 | +1.5 |
| 4 (comparison) | 0.14 | 7 | 60.5 | 1660 | 120.0 | 1560 | 2050 | 0.785 | 1.57 | 0.555 | −1.0 |
| 5 (invention) | 0.13 | 6.5 | 60.5 | 1710 | 122.5 | 1610 | 2200 | 0.795 | 1.66 | 0.515 | +1.1 |
| 6 (invention) | 0.14 | 6.5 | 60.0 | 1710 | 123.0 | 1610 | 2250 | 0.800 | 1.72 | 0.509 | +1.3 |
| 7 (comparison) | 0.14 | 6.5 | 61.0 | 1650 | 120.2 | 1545 | 2080 | 0.765 | 1.47 | 0.565 | −1.2 |
| 8 (invention) | 0.14 | 6.5 | 59.5 | 1670 | 121.0 | 1555 | 2110 | 0.796 | 1.67 | 0.511 | −0.1 |
| 9 (comparison) | 0.14 | 6.5 | 65.0 | 1720 | 107.5 | 1600 | 1870 | 0.755 | 1.40 | 0.525 | −0.8 |
| 10 (comparison) | 0.14 | 7 | 59.0 | 1680 | 121.5 | 1570 | 2050 | 0.765 | 1.48 | 0.550 | −0.9 |

The advantages of the invention are evident from Tables 1 and 2. Among others, the addition of cobalt contributes to a further increase of output in the inventive samples. An attempt to prepare a magnetic metal powder similar to No. 1 without adding Al and Si resulted in a sintered product, failing to produce acicular particles.

TABLE 3

| Sample No. | Additive element content (wt %) | | | | |
|---|---|---|---|---|---|
| | Si | Al | Rare earth | Co | Other |
| 21 (invention) | 0.98 | 1.92 | Nd (1.4) | 6.42 | Ba (0.27) |
| 22 (invention) | 0.98 | 1.92 | Nd (2.3) | 6.42 | Ba (0.27) |
| 23 (invention) | 0.98 | 1.92 | Nd (4.6) | 6.42 | Ba (0.27) |
| 24 (invention) | 0.98 | 1.92 | Nd (9.6) | 6.42 | Ba (0.27) |
| 25 (comparison) | 0.98 | 1.92 | — | — | Ba (0.27) |
| 26 (comparison) | 0.98 | 1.92 | Nd (0.5) | 6.42 | Ba (0.27) |
| 27 (comparison) | 0.98 | 1.92 | Nd (11.5) | 6.42 | Ba (0.27) |
| 28 (invention) | 0.58 | 2.92 | Nd (2.3) | 6.42 | Ba (0.27) |
| 29 (invention) | 0.58 | 0.55 | Nd (2.3) | 6.42 | Ba (0.27) |
| 30 (invention) | 0.98 | 1.92 | Nd (2.3) | 6.42 | — |
| 31 (invention) | 0.98 | 1.92 | Nd (2.3) | — | Ba (0.27) |

TABLE 5

| Sample No. | Additive element content (wt %) | | | | |
|---|---|---|---|---|---|
| | Si | Al | Rare earth | Co | Other |
| 10 (comparison) | 0.97 | 1.92 | — | 6.40 | Ca (0.47) |
| 41 (invention) | 0.97 | 1.92 | Gd (2.3) | 6.40 | Ca (0.47) |
| 42 (invention) | 0.97 | 1.92 | Dy (2.3) | 6.40 | Ca (0.47) |
| 43 (invention) | 0.97 | 1.92 | La (2.3) | 6.40 | Ca (0.47) |
| 44 (invention) | 0.97 | 1.92 | Y (2.3) | 6.40 | Ca (0.47) |
| 45 (invention) | 0.97 | 1.92 | Nd (1.5) +Gd (1.5) | 6.40 | Ca (0.47) |

TABLE 4

| Sample No. | Powder properties | | | | | Tape properties | | | | | |
|---|---|---|---|---|---|---|---|---|---|---|---|
| | L (μm) | L/W | BET (m²/g) | Hc (Oe) | σs (emu/g) | Hc (Oe) | Br (G) | Br/Bm | OR | SFD | Output (dB) |
| 21 (invention) | 0.27 | 13 | 58.0 | 1740 | 126.0 | 1640 | 2420 | 0.882 | 2.53 | 0.410 | +1.0 |
| 22 (invention) | 0.27 | 13 | 58.5 | 1740 | 123.0 | 1645 | 2400 | 0.885 | 2.57 | 0.405 | +1.2 |
| 23 (invention) | 0.27 | 14 | 58.5 | 1750 | 122.7 | 1650 | 2380 | 0.888 | 2.60 | 0.405 | +1.3 |
| 24 (invention) | 0.27 | 13 | 59.5 | 1730 | 120.0 | 1520 | 2300 | 0.875 | 2.49 | 0.430 | +0.8 |
| 25 (comparison) | 0.27 | 13 | 58.0 | 1670 | 120.0 | 1550 | 2250 | 0.845 | 2.10 | 0.510 | −0.8 |
| 26 (comparison) | 0.26 | 13 | 58.0 | 1720 | 126.0 | 1620 | 2270 | 0.850 | 2.16 | 0.480 | −0.1 |
| 27 (comparison) | 0.26 | 12 | 60.5 | 1720 | 115.5 | 1600 | 2150 | 0.835 | 2.05 | 0.495 | −0.5 |
| 28 (invention) | 0.26 | 13 | 59.0 | 1740 | 123.2 | 1640 | 2400 | 0.881 | 2.54 | 0.407 | +1.0 |
| 29 (invention) | 0.26 | 13 | 60.0 | 1730 | 124.0 | 1630 | 2450 | 0.888 | 2.58 | 0.403 | +1.2 |
| 30 (invention) | 0.14 | 7 | 59.5 | 1700 | 122.0 | 1590 | 2250 | 0.805 | 1.80 | 0.495 | +0.8 |
| 31 (invention) | 0.27 | 13 | 59.0 | 1680 | 120.0 | 1580 | 2150 | 0.880 | 2.52 | 0.410 | +0.3 |

The advantages of the invention are evident from Tables 3 and 4.

Example 3

Metal magnetic powder sample Nos. 41 to 44 as shown in Table 5 were obtained by following the same procedure as metal magnetic powder No. 3 in Example 1 except that gadolinium chloride, dysprosium chloride, lanthanum chloride and yttrium chloride were independently used instead of the neodymium chloride. Similarly metal magnetic powder sample No. 45 was obtained using neodymium chloride and gadolinium chloride in combination (Table 5). Using these metal magnetic powder sample Nos. 41 to 45, tape sample Nos. 41 to 45 were similarly fabricated. The metal magnetic powder sample Nos. 41 to 45 and tape sample Nos. 41 to 45 were measured for various properties as in Example 1. The results are shown in Tables 5 and 6 together with those of sample No. 10 in Example 1.

TABLE 6

| Sample No. | Powder properties | | | | | Tape properties | | | | | |
|---|---|---|---|---|---|---|---|---|---|---|---|
| | L (μm) | L/W | BET (m²/g) | Hc (Oe) | σs (emu/g) | Hc (Oe) | Br (G) | Br/Bm | OR | SFD | Output (dB) |
| 10 (comparison) | 0.14 | 7 | 59.0 | 1680 | 121.5 | 1570 | 2050 | 0.765 | 1.48 | 0.550 | −0.9 |
| 41 (invention) | 0.14 | 7 | 59.0 | 1710 | 124.0 | 1610 | 2270 | 0.803 | 1.68 | 0.509 | +1.4 |
| 42 (invention) | 0.14 | 7 | 59.0 | 1720 | 123.5 | 1620 | 2300 | 0.808 | 1.75 | 0.507 | +1.5 |
| 43 (invention) | 0.14 | 7 | 59.0 | 1720 | 123.2 | 1620 | 2380 | 0.802 | 1.68 | 0.510 | +1.4 |
| 44 (invention) | 0.14 | 7 | 58.5 | 1710 | 123.5 | 1610 | 2250 | 0.800 | 1.72 | 0.512 | +1.3 |
| 45 (invention) | 0.14 | 7 | 58.5 | 1710 | 122.0 | 1610 | 2210 | 0.801 | 1.73 | 0.512 | +1.2 |

The advantages of the invention are evident from Tables 5 and 6.

Example 4

By following the same procedure as metal magnetic powder No. 1 in Example 1 except that the amounts of the respective additives were changed as shown in Table 7, metal magnetic powder sample Nos. 101 to 107 as shown in Table 8 were obtained. Using these metal magnetic powder sample Nos. 101 to 107, tape sample Nos. 101 to 107 were similarly fabricated. The metal magnetic powder samples and tape samples were measured for various properties as in Example 1. The results are shown in Table 9.

TABLE 7

| Sample No. | CaCl$_2$ (wt %) | Na$_2$SiO$_3$ (wt %) | Na$_2$AlO$_3$ (wt %) | YCl$_3$.6H$_2$O or NdCl$_3$.6H$_2$O (wt %) | CoCl$_2$ (wt %) |
| --- | --- | --- | --- | --- | --- |
| 101 (invention) | 0.8 | 1.5 | 3.3 | Y 2.5 | 26.0 |
| 102 (invention) | 0.8 | 0 | 5.0 | Y 2.5 | 26.0 |
| 103 (invention) | 0.8 | 4.0 | 0 | Y 2.5 | 26.0 |
| 104 (invention) | 0.5 | 1.5 | 3.3 | Y 2.5 | 26.0 |
| 105 (invention) | 0.8 | 1.5 | 6.0 | Y 2.5 | 0 |
| 106 (invention) | 0.8 | 1.5 | 6.0 | Y 2.5 | 26.0 |
| 107 (invention) | 0.8 | 1.5 | 6.0 | Nd 2.5 | 26.0 |

TABLE 8

| Sample No. | Additive element content ( wt %) | | | | |
| --- | --- | --- | --- | --- | --- |
| | Si | Al | Y or Nd | Co | Other |
| 101 (invention) | 1.42 | 3.22 | Y (2.3) | 25.5 | Ca (0.78) |
| 102 (invention) | 0 | 4.88 | Y (2.3) | 25.5 | Ca (0.78) |
| 103 (invention) | 3.92 | 0 | Y (2.3) | 25.5 | Ca (0.78) |
| 104 (invention) | 1.42 | 3.22 | Y (2.3) | 25.5 | Ca (0.47) |
| 105 (invention) | 1.42 | 5.85 | Y (2.3) | 0 | Ca (0.78) |
| 106 (invention) | 1.42 | 5.85 | Y (2.3) | 25.5 | Ca (0.78) |
| 107 (invention) | 1.42 | 5.85 | Nd (2.3) | 25.5 | Ca (0.78) |

TABLE 9

| Sample No. | Powder properties | | | | | Tape properties | | | | | |
| --- | --- | --- | --- | --- | --- | --- | --- | --- | --- | --- | --- |
| | L (μm) | L/W | BET (m$^2$/g) | Hc (Oe) | σs (emu/g) | Hc (Oe) | Br (G) | Br/Bm | OR | SFD | Output (dB) |
| 101 (invention) | 0.08 | 5 | 59.0 | 1805 | 134.0 | 1690 | 2410 | 0.755 | 1.42 | 0.530 | +2.0 |
| 102 (invention) | 0.07 | 4.5 | 60.0 | 1775 | 134.5 | 1660 | 2450 | 0.748 | 1.40 | 0.532 | +1.8 |
| 103 (invention) | 0.08 | 5 | 59.0 | 1810 | 135.0 | 1700 | 2460 | 0.758 | 1.44 | 0.526 | +1.9 |
| 104 (invention) | 0.14 | 7 | 58.0 | 1780 | 135.0 | 1670 | 2410 | 0.809 | 1.75 | 0.508 | +1.7 |
| 105 (invention) | 0.07 | 4.5 | 62.0 | 1680 | 118.5 | 1580 | 2000 | 0.758 | 1.45 | 0.527 | +0.2 |
| 106 (invention) | 0.07 | 4.5 | 62.5 | 1810 | 132.5 | 1710 | 2420 | 0.755 | 1.44 | 0.529 | +2.1 |
| 107 (invention) | 0.07 | 4.5 | 62.5 | 1790 | 132.0 | 1690 | 2420 | 0.752 | 1.43 | 0.530 | +1.6 |

The advantages of the invention are evident from Tables 8 and 9. Equivalent results to the foregoing were obtained when Ca or Ba was replaced by Sr, Mg, Cr, Ni or Zn.

ADVANTAGE

The present invention is improved in SFD and offers excellent electromagnetic properties as typified by increased outputs in the high-frequency region.

We claim:

1. A magnetic recording medium comprising a magnetic layer containing iron-base metal magnetic powder particles on a non-magnetic substrate, wherein said iron-base metal magnetic powder particles contain at least, 0.5 to 8% by weight, based on the iron, of Al, Si or a mixture of Al and Si, and 1 to 10% by weight, based on the iron, of a rare earth element or Y, one or both of Si and Al, and rare earth element and Y being predominantly present near the surface of said magnetic powder particles, and wherein said iron-base metal magnetic powder particles have a length 0.6 to 0.30 μm and an aspect ratio of from 4 to 15.

2. The magnetic recording medium of claim 1 wherein said iron-base metal magnetic powder particles further contain up to 30% by weight, based on the iron, of Co present in the interior of said magnetic powder particles or both in the interior and at the surface of said magnetic powder particles.

3. The magnetic recording medium of claim 2 wherein the content of Co is 6 to 30% by weight based on the iron.

4. The magnetic recording medium of claim 1 wherein said iron-base metal magnetic powder particles further contain up to 1% by weight, based on the iron, of at least one member selected from the group consisting of Ca, Ba, Sr, Mg, Ni, Cr, and Zn, Ca, Ba, Sr, Mg, Ni, Cr, and Zn being predominantly present near the surface of said magnetic powder particles.

5. The magnetic recording medium of claim 4 wherein said iron-base metal magnetic powder particles further contain up to 30% by weight, based on the iron, of Co present in the interior of said magnetic powder or in the interior and at the surface of said magnetic powder particles.

6. The magnetic recording medium of claim 1 wherein said iron-base metal magnetic powder particles have been obtained by forming hydrous iron oxide, introducing Al and/or Si and the rare earth element therein, and reducing in a reducing atmosphere.

* * * * *

UNITED STATES PATENT AND TRADEMARK OFFICE
CERTIFICATE OF CORRECTION

PATENT NO. : 5,580,399

DATED : December 3, 1996

INVENTOR(S) : Kiminori TAMAI et al

It is certified that error appears in the above-identified patent and that said Letters Patent is hereby corrected as shown below:

Column 12, line 18, "0.6" should read --0.06--.

Signed and Sealed this

Twenty-fourth Day of June, 1997

*Attest:*

BRUCE LEHMAN

*Attesting Officer*     *Commissioner of Patents and Trademarks*